United States Patent
Beck et al.

(10) Patent No.: US 8,894,293 B2
(45) Date of Patent: Nov. 25, 2014

(54) SPLIT BEARING CAGE FOR ROLLING ELEMENT BEARING

(75) Inventors: Burkard Beck, Unterpleichfeld (DE); Burkhard Buchheim, Schweinfurt (DE); Dieter Steblau, Würzburg (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/555,820

(22) Filed: Jul. 23, 2012

(65) Prior Publication Data

US 2013/0034321 A1     Feb. 7, 2013

(30) Foreign Application Priority Data

Aug. 1, 2011 (DE) .......................... 10 2011 080 168

(51) Int. Cl.
*F16C 33/46* (2006.01)
(52) U.S. Cl.
CPC ................................ *F16C 33/4694* (2013.01)
USPC .......................................................... 384/577
(58) Field of Classification Search
CPC ............ F16C 33/4652; F16C 33/3875; F16C 33/4664; F16C 33/3881; F16C 2226/74; F16C 33/4635; F16C 33/4694; F16C 33/3856; F16C 19/26; F16C 19/483
USPC ......................................... 384/523, 572, 577
See application file for complete search history.

(56) References Cited

U.S. PATENT DOCUMENTS

| | | | |
|---|---|---|---|
| 3,399,008 A | 8/1968 | Farrell | |
| 4,239,304 A * | 12/1980 | Wakunami | 384/573 |
| 4,397,507 A | 8/1983 | Kraus et al. | |
| 4,472,007 A | 9/1984 | De Vito | |
| 4,865,473 A | 9/1989 | De Vito | |
| 5,033,876 A * | 7/1991 | Kraus | 384/572 |
| 6,206,575 B1 * | 3/2001 | Matsushita et al. | 384/523 |
| 6,709,163 B2 | 3/2004 | van der Knokke | |
| 6,883,968 B2 * | 4/2005 | Fugel et al. | 384/577 |
| 2006/0204159 A1 | 9/2006 | Yoon | |
| 2010/0215298 A1 * | 8/2010 | Zeidlhack | 384/51 |

FOREIGN PATENT DOCUMENTS

| | | |
|---|---|---|
| DE | 2906128 A1 | 8/1980 |
| DE | 3041860 A1 | 6/1982 |
| DE | 3526625 A1 | 1/1987 |
| DE | 8621532 U1 | 12/1987 |
| DE | 3709039 A1 | 10/1988 |
| DE | 3928913 A1 | 3/1990 |

(Continued)

*Primary Examiner* — James Pilkington
(74) *Attorney, Agent, or Firm* — Bryan Peckjian; SKF USA Inc. Patent Department

(57) ABSTRACT

A bearing cage for a rolling-element bearing includes first and second axially spaced-apart side rings extending in a circumferential direction, each side ring being split in the circumferential direction along a line of separation, thereby defining mutually-opposing bordering surfaces on first and second bearing cage sections. A first projection and a corresponding first opening are disposed on or in the mutually-opposing bordering surfaces of the first and second bearing cage sections. The first projection is insertable into the first opening in the circumferential direction to fix the bearing cage sections in at least a first direction. A second projection and a corresponding second opening are disposed on or in radially-extending, mutually-opposing bordering surfaces of the first projection and first opening. The second projection and second opening fix the bearing cage sections to each other in at least two additional directions, which are each perpendicular to the first direction.

9 Claims, 2 Drawing Sheets

(56) References Cited

FOREIGN PATENT DOCUMENTS

| | | | |
|---|---|---|---|
| DE | 4007452 | A1 | 9/1991 |
| DE | 4211400 | A1 | 10/1993 |
| DE | 10065169 | A1 | 7/2002 |
| JP | 56166321 | * | 12/1981 |
| JP | 59163223 | U | 11/1984 |
| JP | 60024932 | U | 2/1985 |
| JP | H0276222 | U | 6/1990 |
| JP | 10281165 | A | 10/1998 |
| JP | 2003013964 | A | 1/2003 |
| JP | 2008019974 | A | 1/2008 |
| JP | 2010242966 | A | 10/2010 |

* cited by examiner

SPLIT BEARING CAGE FOR ROLLING ELEMENT BEARING

CROSS-REFERENCE

This application claims priority to German Patent Application Number DE10 2011080168.5 filed on Aug. 1, 2011, the contents of which are fully incorporated herein by reference.

TECHNICAL FIELD

The present invention relates to a split bearing cage, e.g., for rolling-element bearings, and to a method for manufacturing such a bearing cage.

BACKGROUND ART

Bearing cages for rolling-element bearings are generally comprised of two axially-spaced-apart side rings and a plurality of bridges that connect the side rings and are disposed one behind the other in a circumferential direction of the bearing cage. Each pair of adjacent bridges forms a pocket for guiding a rolling element. The bearing cage thus holds the rolling elements in the respective pockets spaced apart relative to each other, thereby preventing direct contact between neighboring rolling elements and thus reducing friction and heat generation in the bearing. The bearing cage also ensures a uniform distribution of the rolling elements around the entire circumference of the cage or rolling-element bearing and thus enables a uniform load distribution as well as a quiet and smooth running of the bearing.

Bearing cages are heavily stressed during operation due to frictional, strain and inertial forces. In addition, chemical degradation can occur under certain circumstances due to exposure to certain additives and substances. Design and material selection are therefore of critical importance for the operational reliability of the cage as well as for the operational efficiency of the bearing.

Rolling-element bearing cages typically comprise either pressed cages or solid cages. Pressed cages for rolling-element bearings are usually manufactured from sheet steel, in some cases also from sheet brass. Solid cages for rolling-element bearings can be manufactured, e.g., from brass, steel, aluminum, polymers or phenolic resin.

Solid polymer cages, which are often manufactured using an injection molding process, are characterized by an advantageous combination of strength and elasticity. Good sliding properties of plastic on lubricated steel surfaces and the smoothness of the cage surfaces in contact with the rolling elements lead to low cage friction, a correspondingly low heat generation in the bearing and barely measurable wear. The forces from the inertia of the cage also remain small due to the relatively low material density (as compared to heavier metal cages). The excellent running properties of polymer cages even under lubricant starvation conditions permit continued operation of the bearing for some time without risk of seizure and secondary damage.

For example, polyamide 66, polyamide 45, polyetheretherketone (PEEK), phenolic resin and other polymer materials can be used as the polymers for conventional injection-molded bearing cages.

Bearing cages are known in the prior art that have a through-slot along a cutting or parting line in the circumferential direction. The respective ends of the cage or side ring that border the cutting line are formed as bridges (circumferential bridges), which have projections and openings corresponding to one another in order to fix or couple the cage ends to each other, e.g., using a snap-fit connection. Such split rolling-element bearing cages, in which a "lock" or a "latch" attached to the cage ends secures or fixes the cage ends, can be used in many ways, such as for example for the bearing of balance shafts or for the bearing of gears on shafts in motor vehicles having a manual transmission.

In such known split rolling-element bearing cages, however, the projections and openings on the cage ends are usually designed such that the cage ends are not held captive or fixed in at least one of the axial, radial, and tangential directions. As a consequence, such known connecting or fixing concepts for cage ends are disadvantageous in terms of their load bearing capacity and/or strength in at least one of the aforementioned directions.

SUMMARY

It is therefore an object of the present teachings to disclose an improved securing concept for a split bearing cage as well as for the manufacture of such a split bearing cage.

In one aspect of the present teachings, opposing (adjacent) ends of first and second bearing cage sections of the split bearing cage separated by a cutting line (line of separation) are secured or immovably fixed in at least a first direction by using a pair of a first projection and a corresponding first opening (or in the alternative, a recess, receptacle, through-hole, blind hole, etc.), which are respective formed on or in the bearing cage sections. The first direction is selected from the axial, radial and tangential (circumferential) directions of the bearing cage, but is preferably the axial direction. The first (e.g., male) projection and the first corresponding (e.g., female) opening are formed on or in the bordering surfaces of the cutting line (line or separation) of the first and second bearing cage sections. They are preferably configured to provide an interlocking connection of the first and the second bearing cage sections in at least the first direction upon the insertion of the first projection into the corresponding first opening. In order to additionally fix the two bearing cage sections along the cutting line (line of separation) in two additional directions, which are each perpendicular to the first direction, at least one pair comprising a second projection and a corresponding second opening (or in the alternative, a recess, receptacle, through-hole, blind hole, etc.) is further provided on or in the mutually-opposing bordering surfaces of the first projection and the corresponding first opening, which at least one pair is configured to additionally fix the two bearing cage sections in the two additional directions. Preferably at least two pairs of the second projection and corresponding second opening are provided.

In another aspect of the present teachings, a bearing cage for a rolling-element bearing preferably comprises two axially spaced-apart side rings extending in a circumferential direction. The bearing cage is split in the circumferential direction along at least one or only one cutting line (line of separation) between a first bearing cage section and a second bearing cage section. It should be understand that the cutting line or line of separation need not be linear and may instead include angles, bends or curves along the cutting line or line of separation. According to certain exemplary embodiments of the present teachings, the bearing cage preferably has only one through-slit (cut) along only one cutting line in the circumferential direction of the bearing cage. The pair of the first projection and the corresponding first opening is formed on or in mutually-opposing bordering surfaces of the cutting line. This pair is designed or configured to fix or secure the bearing cage sections in the first direction (from the set of axial, radial, and tangential (circumferential) directions). The at least one pair comprising the second projection and the corresponding second opening is further formed on or in the mutually-opposing bordering surfaces of the first projection and the corresponding first opening. This at least one pair is configured to fix or secure the bearing cage sections to one another in at least two additional directions (different from the first direction).

As will be understood, the three directions (radial, axial and tangential) are preferably perpendicular to each other, such as for example one radial, one tangential and one axial direction (relative to the rotational axis of the bearing cage).

According to another aspect of the present teachings, the first projection formed on the cutting line and the corresponding first opening in the circumferential or tangential direction are formed in or on the mutually-opposing bordering surfaces of the cutting line, so that the first projection can be pushed into the corresponding first opening in the circumferential direction. That is, the first projection and the corresponding first opening each extend in opposing circumferential or tangential directions. As a result, depending upon the embodiment, an axial fixing, a radial fixing or a combined axial/radial fixing of the two bearing cage sections is obtained or provided by the pair of the first projection and the first opening.

According to certain exemplary embodiments, the at least one pair of the second projection and its corresponding second opening is formed on or in bordering surfaces of the first projection and the corresponding first opening so as to be mutually-opposing in the axial and/or the radial direction(s). This means that a second (male) projection can be formed, e.g., on an axial bordering surface of the first projection, whereas a second (female) opening, which corresponds to the first projection, is formed in an axially-opposing bordering surface of the first opening. Naturally, this relationship can be reversed with the same results. In the following, the term "axial bordering surface" is intended to mean a bordering surface that is normal (perpendicular) to the axial direction. Accordingly, the same also applies for each of the other directions. That is, a second projection and the corresponding second opening each extend in mutually-opposing directions perpendicular to the circumferential or tangential direction.

With split bearing cages according to exemplary embodiments of the present teachings, more stable and/or loadable connections of the two bearing cage sections can be achieved than with conventional split bearing cages. By aptly choosing the arrangement or design of the pair of first projection and first opening as well as by coordinating the arrangement or design of the at least one pair comprising the second projection and second opening, an interlocking connection of the bearing cage sections is achieved in the radial, tangential and axial directions, which connection is simultaneously loadable in all of these three directions. Even with bearing cages formed from polymer, the projections and/or openings fail (break) less quickly by using exemplary embodiments of the present teachings than is the case with conventional split bearing cage assemblies.

Preferably, the second projection of the first bearing cage section has a certain oversize, excess or bulge relative to the corresponding second opening of the second bearing cage section (i.e. the cross-section of the second projection is larger than the cross section of the second opening in at least one direction), so that, upon insertion of the second projection into the corresponding second opening, a press-fit, snap-fit or an interlocking connection of the two bearing cage sections can be formed, thereby fixing or securing the bearing cage sections relative to each other along the cutting line (line of separation) in the at least two additional directions, i.e. in addition to the fixing or securing in the first direction by the pair of the first projection and the first opening. Expressed in other words, this means that a fixing of the bearing cage sections in the axial and/or radial direction(s) can be effected by the pair of the first projection and the corresponding first opening. In an exemplary axial fixing of the two bearing cage sections to each other, second projections and openings can be respectively formed in or on axial bordering surfaces of the first projection and the first opening, in order to also fix the bearing cage sections along the cutting line (line of separation) in the radial and the tangential directions. Other constellations or configurations of the various projections and openings are also conceivable within the scope and spirit of the present teachings.

According to some exemplary embodiments of the present teachings, the first projection formed in, on or along (at least partially) the cutting line has an essentially rectangular cross-section perpendicular to the rotational axis of the bearing cage. In this case, the first opening corresponding to the first projection also has a (an inverse) hollow (recessed) space adapted or matched (complementary) to the essentially rectangular cross section of the first projection. That is, the hollow (recessed) space has a complementary rectangular cross section perpendicular to the rotational axis of the bearing cage. The first projection and the first opening may also have corresponding (complementary or inverse) rectangular cross-sections in a plane parallel to the rotational axis. For example, the first projection formed along the cutting line of a bearing cage section can be a rectangular projection. In this case, the corresponding (complementary) first opening formed on or in the mutually-opposing bordering surface of the cutting line can be a rectangular opening matched or adapted thereto.

If an axial fixing of the bearing cage sections should be achieved primarily by the first projection and the first opening, then the first projection and the first opening can extend in the radial direction over or along the entire radial height (and/or radial extension) of the bearing cage section in the radial direction of the bearing cage. The axial extension of the first projection and the first opening should thus be less than the overall or total axial width of the bearing cage sections in the axial direction of the bearing cage. If a radial fixing should additionally be achieved by the first projection and the corresponding first opening, then a lesser radial extension of the first projection and the first opening can be selected or utilized. In an intentionally purely radial fixing of the two bearing cage sections by the pair of the first projection and the first opening is desired, the radial extension (height) of the first opening or the first projection can be set to be less than the radial extension (height) of the bearing ring section, wherein the axial extension (width) of the first projection and the corresponding first opening corresponds to or equals the total axial extension (width) of the bearing cage section in the axial direction.

According to certain embodiments of the present teachings, the second projection(s), which is (are) disposed on the bordering surface(s) of the first projection and the first opening, can have an essentially half-circular or semi-circular cross section parallel to the rotational axis of the bearing cage. In accordance with this design, the second opening(s), which (respectively) correspond(s) to the second projection(s), could have a spherical cross section, which is matched or adapted or complementary to the essentially half-circular or semi-circular cross section of the second projection(s), in the direction parallel to the rotational axis of the bearing cage. This means that the second projection(s), which (is) are formed (disposed) on the first projection or in the first opening, can have an essentially half-spherical (hemispherical) to spherical shape. The corresponding second openings could then have corresponding half-spherical (hemispherical) to spherical shapes.

In order to provide an especially strong and durable axial fixing between the two bearing cage sections, the first projection can have a small or slight oversize (excess or bulge) relative to the corresponding first opening in the axial direction (i.e. the cross-section of the first projection is larger than the cross section of the first opening in at least one direction), so that, upon insertion of the first projection into the first opening, a press-fit, snap-fit or interlocking connection of the bearing cage sections can be formed, in order to fix the bearing cage sections to each other in an especially strong manner along the cutting line in the axial direction. Of course, in other exemplary embodiments, the same is also possible in other directions, such as e.g., in the radial direction.

For a good axial stabilization, the pair of the first projection and the corresponding first opening can extend in the axial direction essentially corresponding to an axial extension (width) of the plurality of connecting bridges that connect the side rings (circumferential bridges). In this case, the likelihood of breakage of the first projection under axial loads can thus be reduced or avoided.

Although bearing cages can in principle be manufactured from various materials as was described in the background section (which description is incorporated herein), exemplary embodiments comprise, in particular, split rolling-element bearing cages formed from plastic or polymer, such as polyamide 66, polyamide 45, polyetheretherketone (PEEK), and phenolic resin. In addition or the alternative, exemplary embodiments of the present teachings comprise rolling-element bearings having split rolling-element bearing cages according to any of the exemplary embodiments disclosed herein. The (e.g., polymer) cages can for example be manufactured using a polymer injection molding method.

In another aspect of the present teachings, a method for manufacturing a bearing cage may comprise forming at least one cutting line (line of separation) in the circumferential direction between first and second bearing cage sections. Further, a pair of a first projection and a first opening may be formed on or in mutually-opposing bordering (adjacent) surfaces along the cutting line (line of separation) and may be configured to fix the mutually-opposing bordering (adjacent) surfaces to each other in at least a first direction. At least one pair (preferably two pairs) of a second projection and a corresponding second opening can be formed in or on the mutually-opposing bordering surfaces of the first projection and the corresponding first opening and may be configured to additionally fix or secure the bearing cage in at least two further directions, which are perpendicular to the first direction.

Further objects, embodiments, designs and advantages of the present invention will become apparent upon reading the following detailed description and claims in view of the appended drawings.

DETAILED DESCRIPTION OF THE INVENTION

Figure 1:
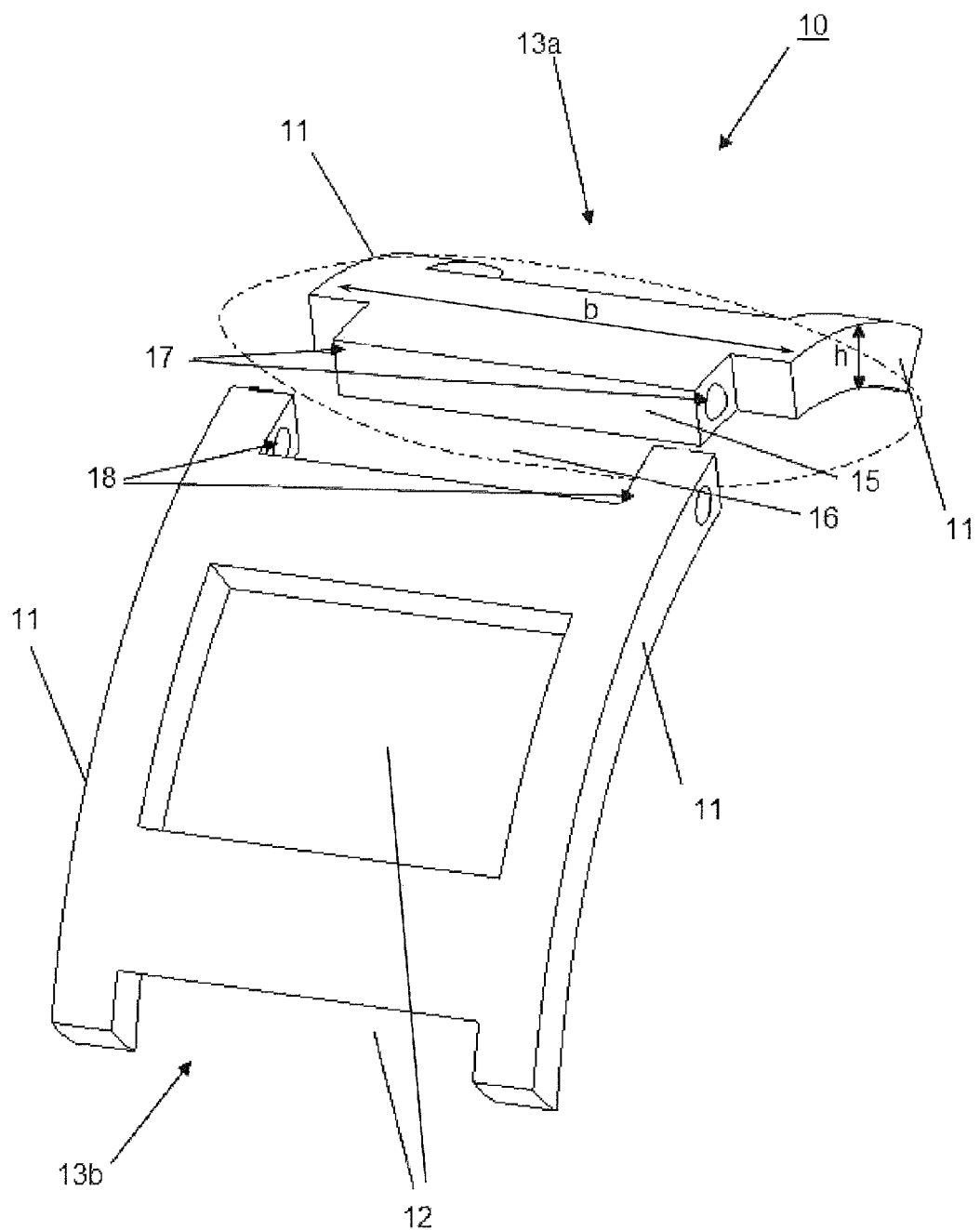
FIG. 1 shows a three-dimensional representation of a split bearing cage having a lock in the open state, according to an exemplary embodiment of the present teachings.

FIG. 1 shows a partial, three-dimensional representation of a stepped split bearing cage 10 according to one exemplary embodiment of the present teachings.

The bearing cage 10 has two axially-spaced-apart side rings 11, each extending in the circumferential direction of the bearing cage 10. Pockets 12 for accommodating or guiding rolling elements (not shown for purposes of clarity) are defined between the side rings 11 by a plurality of connecting bridges (shown, but not numbered). The rolling elements may be, without limitation, e.g., balls, cylindrical rollers, tapered rollers, spherical rollers, etc. The split bearing cage 10 is split in the circumferential direction along at least one cutting line (line of separation), thereby forming a split or gap between first and second bearing cage sections 13a, 13b in the opened state of the bearing ring 10. It should be understood that the ends of the first and second bearing cage sections 13a, 13b, which are opposite of the split or gap, may be integrally connected together without a seam therebetween. Also, as referred to hereinbelow, the "tangential direction" is intended to mean a tangent to the circumference or circumferential direction of the bearing cage 10.

On the bordering (adjacent) surfaces of the cutting line separating the respective bearing cage sections 13a and 13b, a pair of a first projection 15 and a corresponding first opening (recess) 16 is provided and configured to primarily fix the bearing cage sections 13a, 13b in a first (here: axial) direction. On the mutually-opposing bordering (adjacent) surfaces of the first projection 15 and the corresponding first opening 16, two pairs of a second projection 17 and a corresponding second opening 18 are respectively formed and are configured to additionally fix the bearing cage sections 13a, 13b in two further or additional directions (here: the radial and tangential/circumferential directions). That is, the second projection(s) 17 of the first bearing cage section 13a and the corresponding second opening(s) 18 of the second bearing cage section 13b can also be configured to fix the bearing cage sections 13a, 13b to each other in the radial and tangential direction along the cutting line, i.e. so as to prevent relative movement in these directions.

As can be seen from FIG. 1, the first projection 15 formed along the cutting line and the corresponding, opposing first opening 16 can be formed in the circumferential direction (tangential direction) on or in mutually-opposing bordering surfaces of the cutting line, so that the first projection 15 can be pushed into the corresponding first opening 16 by a movement in the circumferential/tangential direction of the bearing cage 10. The first projection 15 and the corresponding opening 16 thus form a kind of step of the cutting line (line of separation) of the two bearing cage sections 13a, 13b, so that a stepped, split bearing cage 10 is provided.

Figure 2:
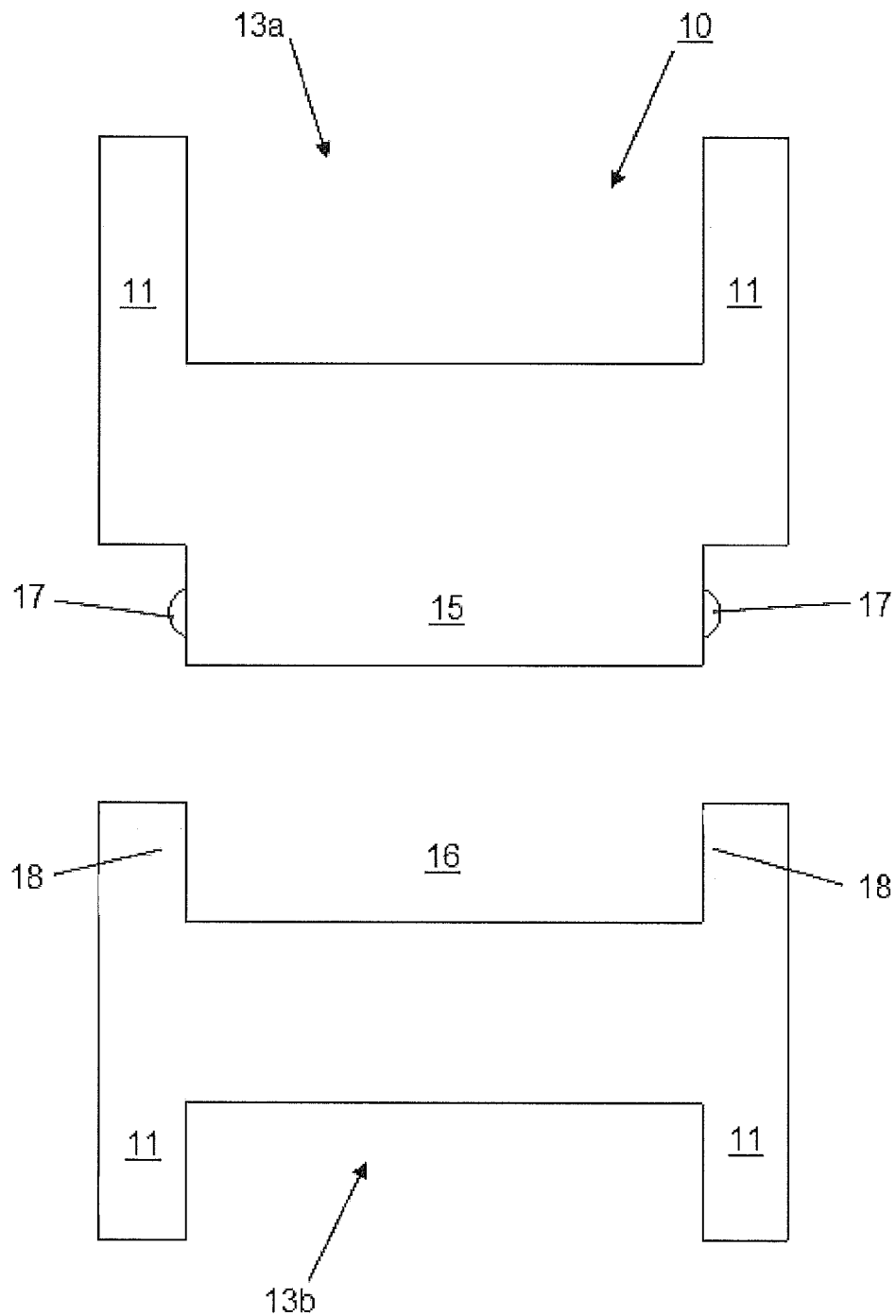
FIG. 2 shows an enlarged top view of the representative lock for the split bearing cage according to FIG. 1 in the opened state.

As can also be seen from FIG. 1 and especially from the enlarged top view of FIG. 2, the first projection 15 points in the tangential/circumferential direction and is formed on the cutting line so as to have an essentially rectangular cross section in the directions both perpendicular and parallel to the rotational axis of the bearing cage 10. The correspondingly-inverse first opening 16 also preferably has an essentially rectangular cross section adapted or matched to the essentially rectangular cross-section of the projection 15. As is schematically illustrated in FIG. 1, the first projection 15 can have or be an essentially rectangular projection and/or lip that extends in the circumferential direction. The first opening 16 is thus a corresponding and mutually-opposing, rectangular opening and/or rectangular hollow space (recess) in the second bearing cage section 13b.

Although the radial extension (height) of the first projection 15 and the first opening 16 in the radial direction is equal to the entire radial height h of the bearing cage sections 13a, 13b in this representative embodiment, so that a purely axial fixing is achieved by the pair of the first projection 15 and the first opening 16, other embodiments could also provide smaller radial extensions (heights) of the first projection and the corresponding first opening. In such a case, in addition or in the alternative, a radial fixing of the two bearing cage sections 13a, 13b can be achieved by the first projection 15 and the first opening 1. For a principally or predominately (e.g., a purely) radial fixing, the pair of the first projection 15 and the first opening 16 could also have an axial extension (width) that corresponds to the entire width b of the bearing cage 10 in the axial direction.

According to certain exemplary embodiments, at least one pair of the second projection 17 and the corresponding second recess 18 are formed in the axial and/or radial direction(s) in or on mutually-opposing bordering (adjacent) surfaces of the first projection 15 and the corresponding first opening 16. Overall, the second projection 17 points in a direction at least substantially perpendicular to the projecting direction of the first projection 15. The same relationship applies to the first opening 16 and the second opening 18. According to the exemplarily embodiment shown in FIG. 1, one second projection 17 is formed on each of the two opposite axial bordering surfaces of the first projection 15, which points in the tangential direction. Each second projection 17 points or extends in the axial direction. Accordingly, two second openings 18 corresponding to the two second projections 17 are formed in the two opposite axial bordering surfaces of the first opening 16. In other embodiments, in addition or in the alternative, further pairs of second projections 17 and openings 18 could also be formed on radial bordering surfaces of the first projection 15 and the first opening 16.

In the present embodiment, the pair of the first projection 15 and the corresponding first opening 16 is formed in order to fix the bearing cage sections 13a, 13b to each other in the axial and/or radial direction(s). However, according to another exemplary embodiment, at least one second projection 17 of the first bearing cage section 13a can have a slight/small oversize (excess or bulge) relative to a second opening 18 of the second bearing cage section 13b. That is, the cross-section of the second projection(s) 17 may be larger in at least one dimension than the cross-section of the second opening(s) 18. In this case, upon inserting a second projection 17 into a second opening 18, a snap-fit, press-fit or clamping connection of the bearing cage sections 13a, 13b can be formed, in order to fix the bearing cage sections to each other along their cutting line in the radial (or axial) and also tangential directions.

According to certain embodiments of the present teachings, the at least one second projection(s) 17 can have an essentially half-circular (semi-circular) to circular-shaped cross section parallel to the rotational axis of the bearing cage 10, wherein a (each) second opening 18 corresponding to the at least one second projection(s) 17 has a spherical cross section parallel to the rotational axis of the bearing cage 10 that is adapted or matched to the essentially half-circular (semi-circular) to circular-shaped cross section. Expressed in other words, this means that a (each) second projection 17 can have an essentially half-spherical (hemispherical) to spherical geometry. A (each) second opening 18 could then have shape corresponding or conforming or complementary thereto. In an embodiment having an oversize (excess or bulge) of the second projection(s) 17 relative to the second opening(s) 18, spherical geometries can be especially advantageous.

Due to the combination of the first pair of the first projection 15 and first opening 16, as well as the second pair(s) of second projection(s) 17 and second opening(s) 18 located thereon or therein, the two bearing cage sections 13a, 13b of the stepped, split bearing cage 10 can be advantageously fixed to each other in all three perpendicular directions, i.e. the axial, tangential and radial directions. The strength of the respective fixings can be adjusted by modifying the respective geometries of the projections 15, 17 and the openings 16, 18.

If for example an especially pronounced or strong axial fixing should be achieved, then the first projection 15 can have a slight (small) oversize (excess or bulge) in the axial direction relative to the corresponding first opening 16. In this case, upon inserting the first projection 15 into the first opening 16, a type of press-fit or snap-fit of the bearing cage sections 13a, 13b can be formed, in order to fix the bearing cage sections 13a, 13b to each other along the cutting line in the axial direction. Naturally, this requires a certain amount of elasticity that is inherent to all plastic bearing cages, but also present in some metal-based bearing cages. In one such embodiment, the second projections 17 and the corresponding second openings 18 can such small dimensions that that the axial press-fit is not provided. In this case, the dimensions of the second projections 17 and the second openings 18 can be adjusted to provide, e.g., a stronger or a rather weaker radial/tangential fixing of the two bearing cage sections 13a, 13b.

According to some exemplary embodiments of the present teachings, the pair of the first projection 15 and the corresponding first opening 16 can extend in the axial direction substantially corresponding to the axial extension (width) of one (or all) of the connecting bridges connecting the circumferential bridges (side rings) 11. That is, the axial extension of the first projection 15 and/or the corresponding first opening 16 can substantially or exactly correspond to the axial extension (length) of the pockets 12 for accommodating the rolling elements, which pockets 12 are bounded or delimited by the connecting bridges. In some exemplary embodiments, this can be a quite significant extension, measured in terms of the total axial extension (length) of the bearing cage 10, whereby a very stable coupling of the two bearing cage sections 13a, 13b can be achieved, especially in the axial direction. For example, the axial extension of the first projection 15 (and therewith also the axial extension of the corresponding first opening 16) could fall within the range of 40% to 98% of the total axial extension (width) of the bearing cage 10 in the axial direction, and e.g., within the range of 70% to 90% of the total axial extension (width) of the bearing cage 10 in the axial direction. In the press-fit or snapped-fit state of the second projection(s) 17 and the second opening(s) 18 and/or the bearing cage sections 13a, 13b, the first projection 15 can thus also act like a kind of connecting bridge between the side rings 11.

Of course, the dimensions of the projections 15, 17 as well as the openings 16, 18 described in the present specification can also be chosen quite differently, in order to adapt the stepped split bearing cage design to the radial, tangential, and/or axial loads of a particular application of the present teachings. Thus, for example, a plurality of adjacently-disposed first projections 15 could also be disposed between the axially-outward first side rings 11 instead of a single first projection 15. The same also applies for the corresponding first opening 16.

Exemplary embodiments of the split bearing cage 10 described herein can for example be manufactured from a plastic material, such as a polymer. For example, the stepped split bearing cage 10 can be manufactured using a polymer injection-molding process. With only one cutting line in an annular bearing cage, the bearing cage 10 can also be a one-piece injection molded component.

It is self-evident that stepped split bearing cages in accordance with the present teachings can be used in rolling-element bearings, so that exemplary embodiments of the present teachings also comprise rolling-element bearings having any of the presently-disclosed bearing cages with rolling elements disposed therein.

In summary, the above-described exemplary embodiments of the present teachings generally relate to a stepped split polymer cage having a detachable lock or latch. The stepped split-shape can ensure a fixing of the open sides or sections in the axial direction and prevent a relative displacement. The lock (latch), which comprises e.g., the openings 16, 18 on the split side and the projections 15, 17, e.g., on the opposing split side, can prevent a gap and ensure an interference-fit or press-fit between open slot sides after a "radial/axial snapping-on of a roller-and-cage assembly onto a shaft" mounting process. Thus the combination "stepped split+lock" provides a fixing of the bearing cage section in the axial, radial, and tangential directions.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing cages, rolling element bearings and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST 10 split bearing cage
11 side ring, circumferential bridge
12 pocket for rolling elements
13a and 13b bearing cage section
15 first projection
16 first opening
17 second projection
18 second opening

The invention claimed is:

1. A bearing cage for a rolling-element bearing comprising:
a first side ring and a second side ring being axially spaced-apart from the first side ring, the first and second side rings extending in a circumferential direction, each of the first and second side rings being split along a radial line of separation which extends through one portion of the circumference, thereby defining first mutually-opposable surfaces on a first and a second bearing cage section, ends of the first and second bearing cage sections located generally opposite from the radial line of separation being integrally connected without a seam therebetween,
at least one pair of a first projection and a corresponding first opening disposed on or in the first mutually-opposable surfaces of the first and second bearing cage sections, the first projection and first opening being configured, when engaged, to fix the bearing cage sections to each other in at least a first direction,
at least one pair of a second projection and a corresponding second opening disposed on or in second mutually-opposable surfaces of the first projection and first opening, the pair of the second projection and second opening being configured, when engaged, to fix the bearing cage sections to each other in at least two additional directions, which are each perpendicular to the first direction,
the at least one second projection of the first bearing cage section is oversized relative to the at least one second opening of the second bearing cage section, so that, upon insertion of the at least one said second projection into the at least one second opening, a snap-fit or press-fit connection of the bearing cage sections is formed, to fix the bearing cage sections to each other along the line of separation to prevent relative movement in at least a circumferential direction, such that a diameter of the bearing cage is constant,
wherein the first projection is insertable into the corresponding first opening in the circumferential direction, the first projection has a rectangular cross section in directions both perpendicular and parallel to the rotational axis of the bearing cage, and
the first opening corresponding to the first projection also has a rectangular cross section in the directions both perpendicular and parallel to the rotational axis of the bearing cage, such that the first opening has a shape that is complementary to the first projection and prevents rotation therebetween, the rectangular cross section of the first projection is oversized in the axial direction relative to the rectangular cross section of the corresponding first opening, so that, upon insertion of the first projection into the first opening, axial pressure is increased between the first projection and the first opening and between the at least one second projection and the at least one second opening, and wherein
a plurality of pockets are formed in the bearing cage configured for receiving rolling elements, the plurality of pockets being the only through-holes formed in the circumference of the bearing cage.

2. The bearing cage according to claim 1, wherein the pair of the first projection and the first opening is configured to fix the bearing cage sections to each other in the axial and/or radial direction(s).

3. The bearing cage according to claim 2, wherein the at least one second projection has an essentially half-circular to circular cross section in the direction(s) parallel and/or perpendicular to the rotational axis of the bearing cage, and
the at least one second opening corresponding to the at least second projection has an essentially half-circular to circular cross section in the direction(s) parallel and/or perpendicular to the rotational axis of the bearing cage, such that the at least one second opening has a shape that is complementary to the at least one second projection.

4. The bearing cage according to claim 3, wherein the bearing cage comprises a polymer material and is formed in one integral piece.

5. The bearing cage according to claim 4, wherein each of the plurality of pockets is defined between adjacent connecting bridges of the bearing cage.

6. The bearing cage according to claim 1, wherein the at least one second projection has an essentially half-circular to circular cross section in direction(s) parallel and/or perpendicular to the rotational axis of the bearing cage, and the at least one second opening corresponding to the at least second projection has an essentially half-circular to circular cross section in the direction(s) parallel and/or perpendicular to the rotational axis of the bearing cage, such that the at least one second opening has a shape that is complementary to the at least one second projection.

7. The bearing cage according to claim 1, wherein the bearing cage comprises a polymer material and is formed in one integral piece.

8. A rolling-element bearing comprising:
a bearing cage according to claim 1, and
a plurality of rolling elements respectively disposed in pockets defined between adjacent connecting bridges of the bearing cage.

9. A method of manufacturing a bearing cage having two axially spaced side rings extending in a circumferential direction, the method comprising simultaneously or in any order:

forming one line of separation in the circumferential direction between a first and a second bearing cage section of the bearing cage, such that the first and second bearing cage sections are formed as one continuous piece of material, forming a pair of a first projection and a corresponding first opening on or in first mutually-opposable surfaces along the line of separation, the first projection and the first opening having a rectangular cross-section in directions both perpendicular and parallel to a rotational axis of the bearing cage, such that the first opening has a shape that is complementary to the first projection and prevents rotation therebetween, the first projection being insertable into the first opening in the circumferential direction to fix the bearing cage sections to each other in at least one direction, the rectangular cross section of the first projection is oversized in the axial direction relative to the rectangular cross section of the corresponding first opening, so that, upon insertion of the first projection into the first opening, axial pressure is increased between the first projection and the first opening and between the at least one second projection and the at least one second opening; and forming a pair of a second projection and a corresponding second opening on second mutually-opposable surfaces of the first projection and the corresponding first opening, the second projection and second opening being configured, when engaged, to fix the bearing cage sections in at least two additional directions that are perpendicular to the first direction, the at least one second projection of the first bearing cage section is oversized relative to the at least one second opening of the second bearing cage section, so that, upon insertion of the at least one said second projection into the at least one second opening, a snap-fit or press-fit connection of the bearing cage sections is formed, to fix the bearing cage sections to each other along the line of separation to prevent relative movement in at least a circumferential direction, such that a diameter of the bearing cage is constant, providing a plurality of pockets in the bearing cage configured for receiving rolling elements, the plurality of pockets being the only through-holes formed in the circumference of the bearing cage.

\* \* \* \* \*